(12) United States Patent
Chen et al.

(10) Patent No.: US 11,304,187 B2
(45) Date of Patent: Apr. 12, 2022

(54) DATA TRANSMISSION METHOD, DEVICE, NETWORK DEVICE AND USER EQUIPMENT

(71) Applicant: CHINA ACADEMY OF TELECOMMUNICATIONS TECHNOLOGY, Beijing (CN)

(72) Inventors: Runhua Chen, Beijing (CN); Qiubin Gao, Beijing (CN); Rakesh Tamrakar, Beijing (CN); Hui Li, Beijing (CN); Qiuping Huang, Beijing (CN); Xin Su, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 100 days.

(21) Appl. No.: 16/622,887

(22) PCT Filed: May 30, 2018

(86) PCT No.: PCT/CN2018/089021
§ 371 (c)(1),
(2) Date: Dec. 13, 2019

(87) PCT Pub. No.: WO2018/228195
PCT Pub. Date: Dec. 20, 2018

(65) Prior Publication Data
US 2020/0213979 A1    Jul. 2, 2020

(30) Foreign Application Priority Data

Jun. 16, 2017   (CN) .......................... 201710456992.2

(51) Int. Cl.
*H04W 72/04* (2009.01)

(52) U.S. Cl.
CPC ....... *H04W 72/042* (2013.01); *H04W 72/046* (2013.01)

(58) Field of Classification Search
CPC .. H04W 72/042; H04W 72/046; H04W 72/04
See application file for complete search history.

(56) References Cited

U.S. PATENT DOCUMENTS

| 8,320,267 B2 | 11/2012 | Wei et al. |
| 2009/0060082 A1 | 3/2009 | Yuda et al. |

(Continued)

FOREIGN PATENT DOCUMENTS

| CN | 101330325 A | 12/2008 |
| CN | 103260234 A | 12/2008 |

(Continued)

OTHER PUBLICATIONS

First Office Action and Search Report from CN app. No. 201710456992.2, dated Mar. 19, 2020, with English translation provided by Global Dossier.

(Continued)

*Primary Examiner* — Chi Ho A Lee
*Assistant Examiner* — Andrew Lee
(74) *Attorney, Agent, or Firm* — Ladas & Parry, LLP (57) ABSTRACT

Embodiments of the present disclosure provide a data transmission method, a data transmission device, a network side device and UE. The data transmission method is applied to a first device and includes: transmitting Uplink (UL) Sounding Reference Signal (SRS) resource configuration information to a second device, where the SRS resource configuration information indicates K SRS resources; receiving an SRS signal transmitted from the second device according to the SRS resource configuration information; determining an SRS Resource Indicator (SRI), where the SRI indicates L SRS resources in the K SRS resources, L is an integer that (Continued)

is larger than or equals 1 and L is less than or equals K; and transmitting the SRI to the second device.

16 Claims, 5 Drawing Sheets

(56) References Cited

U.S. PATENT DOCUMENTS

| | | | |
|---|---|---|---|
| 2009/0262695 A1* | 10/2009 | Chen | H04B 7/0456 370/329 |
| 2011/0013546 A1 | 1/2011 | Hao et al. | |
| 2011/0090862 A1 | 4/2011 | Liang et al. | |
| 2013/0294344 A1 | 11/2013 | Yu | |
| 2017/0331606 A1* | 11/2017 | Chen | H04W 76/27 |
| 2018/0062724 A1* | 3/2018 | Onggosanusi | H04B 7/0413 |
| 2018/0206132 A1* | 7/2018 | Guo | H04B 7/02 |
| 2019/0199553 A1* | 6/2019 | Park | H04W 72/06 |
| 2019/0223094 A1* | 7/2019 | Ingale | H04W 68/005 |
| 2019/0372724 A1* | 12/2019 | Baek | H04L 47/34 |
| 2019/0372734 A1* | 12/2019 | Choi | H04L 25/0224 |
| 2020/0083939 A1* | 3/2020 | Park | H04B 7/0404 |
| 2020/0083998 A1* | 3/2020 | Chen | H04W 72/0413 |
| 2020/0196316 A1* | 6/2020 | Zhang | H04W 72/0493 |

FOREIGN PATENT DOCUMENTS

| | | |
|---|---|---|
| CN | 102036302 A | 4/2011 |
| CN | 101330325 B | 9/2012 |
| CN | 101335969 A | 8/2013 |
| EP | 3493418 A1 | 6/2019 |
| WO | 2006118123 A1 | 11/2006 |

OTHER PUBLICATIONS

Extended European Search Report from EP app. No. 18817379.3, dated May 6, 2020.
First Office Action and search report from TW app. No. 107119989, dated May 10, 2020, with machine English translation.
International Search Report from PCT/CN2018/089021, dated Aug. 21, 2019, 2019, with English translation from WIPO.
Written Opinion of the International Searching Authority from PCT/CN2018/089021, dated Aug. 21, 2018, with English translation from WIPO.
International Preliminary Report on Patentability from PCT/CN2018/089021, dated Dec. 17, 2019, with English translation from WIPO.
"On codebook based UL MIMO transmission with precoded SRS", R1-1703225, 3GPP TSG-RAN WG1 #88, Athens, Greece, Feb. 13-17, 2013.
"Codebook based UL transmission", R1-1707113, 3GPP TSG-RAN WG1 Meeting #89, Hangzhou, P.R. China, May 15-19, 2017.
"DCI design considerations for NR", R1-1707384, 3GPP TSG-RAN WG1 Meeting #89, Hangzhou, P.R. China, May 15-19, 2017.
"Discussion on UL beam management", R1-1707476, 3GPP TSG-RAN WG1 Meeting #89, Hangzhou, P.R. China, May 15-19, 2017.
"UL MIMO procedures for non-codebook based transmission", R1-1708670, 3GPP TSG-RAN WG1 Meeting #89, Hangzhou, P.R. China, May 15-19, 2017.
Notice of Reasons for Refusal from JP app. No. 2019-569744, dated Mar. 2, 2021, with English translation from Global Dossier.

* cited by examiner

DATA TRANSMISSION METHOD, DEVICE, NETWORK DEVICE AND USER EQUIPMENT

CROSS-REFERENCE TO RELATED APPLICATIONS

This application is the U.S. national phase of PCT Application PCT/CN2018/089021 filed on May 30, 2018, which claims the benefit and priority to Chinese Application No, 201710456992.2, filed on Jun. 16, 2017 the disclosures of which are incorporated herein by reference in their entireties.

TECHNICAL FIELD

The present disclosure relates to the field of communication technology, and more particularly to a data transmission method, a data transmission device, a network side device and User Equipment (UE).

BACKGROUND

In view of the important role of Multiple Input Multiple Output (MIMO) technology in improving peak rate and utilization of the system spectrum, wireless access technology standards such as the Long Term Evolution (LTE)/LTE-Advanced (LTE-A) are constructed based on MIMO plus Orthogonal Frequency Division Multiplexing (OFDM). The performance gain of the MIMO technology comes from the spatial freedom obtained by the multi-antenna system. Therefore, one of the most important evolution directions of the MIMO technology in the development process of standardization is expansion of dimensions.

The LTE Rel-8 supports up to 4 layers of MIMO transmission. Rel-9 focuses on the enhancement of Multi-User MIMO (MU-MIMO) technology. Transmission Mode (TM)-8 MU-MIMO transmission can support up to 4 Downlink (DL) data layers. The Rel-10 introduces 8 antenna ports to further improve the spatial resolution of channel state information, and further extend the transmission capability of Single-User MIMO (SU-MIMO) to up to 8 data layers. The Rel-13 and Rel-14 introduce the Frequency Division-MIMO (FD-MIMO) technology to support port 32 to achieve full dimensions and vertical beam forming.

In order to further improve the MIMO technology, large-scale antenna technology is introduced into the mobile communication system. For base stations, fully digital large-scale antennas can have up to 128/256/512 antenna units and up to 128/256/512 transceiver units and each antenna unit connects to a transceiver unit. By transmitting pilot signals up to 128/256/512 antenna ports, the terminal measures channel state information and feeds back. For terminals, an antenna array with up to 32/64 antenna units can also be configured. Through beam forming on the base station and the terminal, a huge beam forming gain is obtained to make up for the signal attenuation caused by path loss. Especially in high frequency communication, such as 30 GHz, path loss makes the coverage of wireless signal extremely limited. With large-scale antenna technology, the coverage of the wireless signal can be extended to a practical range.

Beam forming can be implemented by simulating beam forming and digital-analog hybrid beam forming, both of which require to adjust weights of the analog beam forming of the transmitting end and receiving end, so that the beams formed by them can be aligned with the opposite end of the communication. For DL transmission, the weight of the beam forming transmitted by the base station side and weight of the beam forming received by the terminal side require to be adjusted. However, for Uplink (UL) transmission, the weight of the beam forming transmitted by the terminal side and weight of the beam forming received by the base station side require to be adjusted. The weight of the beam forming is usually obtained by transmitting training signals. On the DL direction, the base station transmits the DL beam training signal, the terminal measures the DL beam training signal, selects the best beam transmitted by the base station, and feeds back the information related to beam to the base station, meanwhile selects the corresponding best received beam and saves it locally.

The UE equipped with multiple transmitting antennas can perform UL beam forming, but in the existing mode, the UE is impossible to determine the specific UL data transmission implementation process via the UL Sounding Reference Signal (SRS) resources indicated by the received Transmission Reference Point (TRP).

SUMMARY

An objective of the present disclosure is to provide a data transmission method, a data transmission device, a network side device and UE to implement the UL data transmission indicated by the TRP.

In order to achieve the above objective, an embodiment of the present disclosure provides a data transmission method, applied to a first device, including:

transmitting Uplink (UL) Sounding Reference Signal (SRS) resource configuration information to a second device, where the SRS resource configuration information indicates K SRS resources;

receiving an SRS signal transmitted from the second device according to the SRS resource configuration information;

determining an SRS Resource Indicator (SRI), where the SRI indicates L SRS resources in the K SRS resources, L is an integer that is larger than or equals 1 and L is less than or equals K; and transmitting the SRI to the second device.

The method further includes:

determining a Transmission Rank Indicator (TRI) corresponding to UL data transmission of the second device, where the TRI denotes a layer number of the UL data transmission; and transmitting the TRI to the second device.

Each layer of the UL data transmission has a corresponding relationship with at least one SRS resource indicated by the SRI.

A UL beam forming matrix adopted by each layer of the UL data transmission is consistent with a UL beam forming matrix of SRS resources corresponding to the layer of the UL data transmission.

The corresponding relationship between the each layer of the UL data transmission and the at least one SRS resource in the L SRS resources is indicated by a Layer-to-SM mapping Indicator (LSI) and the method further includes:

transmitting the LSI to the second device.

The corresponding relationship between the each layer of the UL data transmission and the at least one SRS resource in the L SRS resources is indicated by the SRI.

The number L of SRS resources indicated by the SRI is consistent with the layer number of the UL data transmission or codeword number.

A k-th SRS resource indicated by the SRI has a corresponding relationship with a k-th layer of the UL data transmission or k-th codeword, 1≤k≤L, k is an integer.

In order to achieve the above objective, an embodiment of the present disclosure provides a data transmission method, applied to a second device, including:

receiving Uplink (UL) Sounding Reference Signal (SRS) resource configuration information transmitted from a first device, where the SRS resource configuration information indicates K SRS resources;

transmitting an SRS signal to the first device according to the SRS resource configuration information;

receiving an SRS Resource Indicator (SRI) transmitted from the first device, where the SRI indicates L SRS resources in the K SRS resources, L is an integer that is larger than or equals 1 and L is less than or equals K; and performing UL data transmission according to the SRI.

The method further includes:

receiving a Transmission Rank Indicator (TRI) corresponding to the UL data transmission transmitted from the first device, where the TRI denotes a layer number of the UL data transmission; and parsing the TRI to obtain the layer number of the UL data transmission determined by the first device for the second device.

Each layer of the UL data transmission has a corresponding relationship with at least one SRS resource indicated by the SRI.

A UL beam forming matrix adopted by each layer of the UL data transmission is consistent with a UL beam forming matrix of SRS resources corresponding to the layer of the UL data transmission.

The corresponding relationship between the each layer of the UL data transmission and the at least one SRS resource in the L SRS resources is indicated by a Layer-to-SRI mapping Indicator (LSI); and the method further includes:

receiving the LSI transmitted from the first device;

parsing the LSI to obtain the corresponding relationship between the each layer of the UL data transmission and the at least one SRS resource in the L SRS resources.

The corresponding relationship between the each layer of the UL data transmission and the at least one SRS resource in the L SRS resources is indicated by the SRI; performing the UL data transmission according to the SRI includes:

parsing the SRI to obtain the corresponding relationship between the each layer of the UL data transmission and the at least one SRS resource in the L SRS resources;

respectively transmitting corresponding layers of UL data transmission using the L SRS resources.

The number L of SRS resources indicated by the SRI is consistent with layer number of the UL data transmission or codeword number.

A k-th SRS resource indicated by the SRI has a corresponding relationship with a k-th layer of the UL data transmission or k-th codeword, 1≤k≤L, k is an integer.

In order to achieve the above objective, an embodiment of the present disclosure further provides a data transmission device, applied to a first device, including:

a first transmission module, configured to transmit Uplink (UL) Sounding Reference Signal (SRS) resource configuration information to a second device, where the SRS resource configuration information indicates K SRS resources;

a first receiving module, configured to receive an SRS signal transmitted from the second device according to the SRS resource configuration information;

a first determination module, configured to determine an SRS Resource Indicator (SRI), where the SRI indicates L SRS resources in the K SRS resources, L is an integer that is larger than or equals 1 and L is less than or equals K; and a second transmission module, configured to transmit the SRI to the second device.

The device further includes:

a second determination module, configured to determine a Transmission Rank Indicator (TRI) corresponding to UL data transmission of the second device, where the TRI denotes layer number of the UL data transmission; and a third transmission module, configured to transmit the TRI to the second device.

Each layer of the UL data transmission has a corresponding relationship with at least one SRS resource indicated by the SRI.

A UL beam forming matrix adopted by each layer of the UL data transmission is consistent with a UL beam forming matrix of SRS resources corresponding to the layer of the UL data transmission.

The corresponding relationship between the each layer of the UL data transmission and the at least one SRS resource in the L SRS resources is indicated by a Layer-to-SM mapping Indicator (LSI); and the device further includes:

a fourth transmission module, configured to transmit the LSI to the second device.

The corresponding relationship between the each layer of the UL data transmission and the at least one SRS resource in the L SRS resources is indicated by the SRI.

The number L of SRS resources indicated by the SM is consistent with layer number of the UL data transmission or codeword number.

A k-th SRS resource indicated by the SM has a corresponding relationship with a k-th layer of the UL data transmission or k-th codeword, 1≤k≤L, k is an integer.

In order to achieve the above objective, an embodiment of the present disclosure further provides a data transmission device, applied to a second device, including:

a second receiving module, configured to receive Uplink (UL) Sounding Reference Signal (SRS) resource configuration information transmitted from a first device, where the SRS resource configuration information indicates K SRS resources;

a fifth transmission module, configured to transmit an SRS signal to the first device according to the SRS resource configuration information;

a third receiving module, configured to receive an SRS Resource Indicator (SRI) transmitted from the first device, where the SRI indicates L SRS resources in the K SRS resources, L is an integer that is larger than or equals 1 and L is less than or equals K; and a UL data transmission module, configured to perform UL data transmission according to the SRI.

The device further includes:

a fourth receiving module, configured to receive a Transmission Rank Indicator (TRI) corresponding to the UL data transmission transmitted from the first device, where the TRI denotes a layer number of the UL data transmission; and a first processing module, configured to parse the TRI to obtain the layer number of the UL data transmission determined by the first device for the second device.

Each layer of the UL data transmission has a corresponding relationship with at least one SRS resource indicated by the SRI.

A UL beam forming matrix adopted by each layer of the UL data transmission is consistent with a UL beam forming matrix of SRS resources corresponding to the layer of the UL data transmission.

The corresponding relationship between the each layer of the UL data transmission and the at least one SRS resource in the L SRS resources is indicated by a Layer-to-SRI mapping Indicator (LSI); and the device further includes:

a fifth receiving module, configured to receive the LSI transmitted from the first device; and a second processing module, configured to parse the LSI to obtain the corresponding relationship between the each layer of the UL data transmission and the at least one SRS resource in the L SRS resources.

The corresponding relationship between the each layer of the UL data transmission and the at least one SRS resource in the L SRS resources is indicated by the SRI; the UL data transmission module includes:

a parsing sub-module, configured to parse the SRI to obtain the corresponding relationship between the each layer of the UL data transmission and the at least one SRS resource in the L SRS resources;

a transmission sub-module, configured to respectively transmit corresponding layers of UL data transmission using the L SRS resources.

The number L of SRS resources indicated by the SRI is consistent with the layer number of the UL data transmission or codeword number.

A k-th SRS resource indicated by the SRI has a corresponding relationship with a k-th layer of the UL data transmission or k-th codeword, 1≤k≤L, k is an integer.

In order to achieve the above objective, an embodiment of the present disclosure provides a network side device including: a storage, a transceiver, a processor and computer programs, which are stored in the storage and run on the processor. When the processor executes the computer programs, following steps are implemented: transmitting Uplink (UL) Sounding Reference Signal (SRS) resource configuration information to a second device via the transceiver, where the SRS resource configuration information indicates K SRS resources; receiving an SRS signal transmitted from the second device according to the SRS resource configuration information; determining an SRS Resource Indicator (SRI), where the SRI indicates L SRS resources in the K SRS resources, L is an integer that is larger than or equals 1 and L is less than or equals K; and transmitting the SRI to the second device.

In order to achieve the above objective, an embodiment of the present disclosure provides a user device, including: a storage, a transceiver, a processor and computer programs, which are stored in the storage and run on the processor. When the processor executes the computer programs, following steps are implemented: receiving Uplink (UL) Sounding Reference Signal (SRS) resource configuration information transmitted from a first device via the transceiver, where the SRS resource configuration information indicates K SRS resources; transmitting an SRS signal to the first device according to the SRS resource configuration information; receiving an SRS Resource Indicator (SRI) transmitted from the first device, where the SRI indicates L SRS resources in the K SRS resources, L is an integer that is larger than or equals 1 and L is less than or equals K; and performing UL data transmission according to the SRI.

In order to achieve the above objective, an embodiment of the present disclosure provides a computer readable storage medium, storing computer programs, wherein when the computer programs are executed by the processor, following steps are implemented: transmitting Uplink (UL) Sounding Reference Signal (SRS) resource configuration information to a second device, wherein the SRS resource configuration information indicates K SRS resources; receiving an SRS signal transmitted from the second device according to the SRS resource configuration information; determining an SRS Resource Indicator (SRI), wherein the SRI indicates L SRS resources in the K SRS resources, L is an integer that is larger than or equals 1 and L is less than or equals K; and transmitting the SRI to the second device.

In order to achieve the above objective, an embodiment of the present disclosure provides a computer readable storage medium, storing computer programs, wherein when the computer programs are executed by the processor, following steps are implemented: receiving Uplink (UL) Sounding Reference Signal (SRS) resource configuration information transmitted from a first device, wherein the SRS resource configuration information indicates K SRS resources; transmitting an SRS signal to the first device according to the SRS resource configuration information; receiving an SRS Resource Indicator (SRI) transmitted from the first device, wherein the SRI indicates L SRS resources in the K SRS resources, L is an integer that is larger than or equals 1 and L is less than or equals K; and performing UL data transmission according to the SRI.

The beneficial effects of the above technical scheme of the present disclosure are as follows.

The data transmission method in embodiments of the present disclosure first transmits the SRS resource configuration information, which indicates K SRS resources and is configured for the second device, to the second device. The second device receives the SRS resource configuration information, and then transmits the SRS through K SRS resources according to the SRS resource configuration information. After the first device receives the SRS transmitted from the second device, the first device optimally selects L SRS resources from K SRS resources and determines the SRI indicating the L SRS resources. Then, the first device transmits the SRI to the second device to inform the second device of the SRS resources of UL data transmission. Therefore, after receiving the SRI, the second device can use the L optimal SRS resources to complete the UL data transmission, so as to solve the problem that the existing mode cannot determine the specific implementation process of UL data transmission.

DETAILED DESCRIPTION

To make the technical problems, technical solutions, and advantages of the present disclosure clearer, detailed description will be described hereinafter in conjunction with the embodiments and the accompanying drawings.

For an existing problem that the UE cannot determine the implementation process of the UL data transmission, embodiments of the present disclosure provide a data transmission method. The UL data transmission is implemented via instructing the UE to use preferred SRS resources in the originally configured SRS resources.

Figure 1:
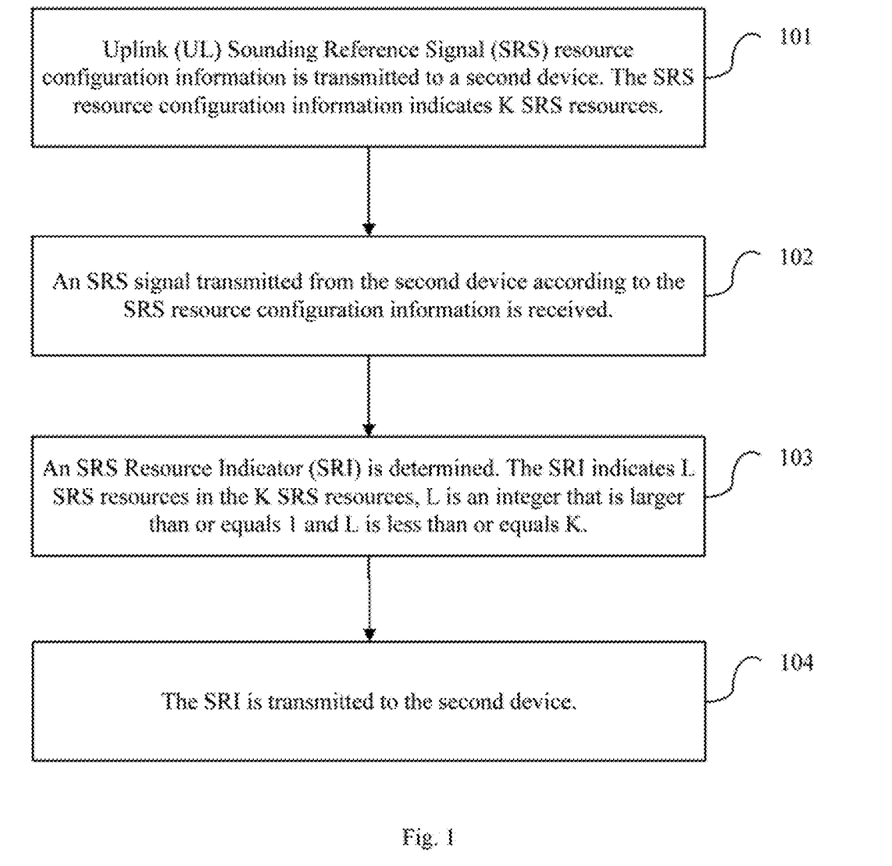
FIG. 1 is a flow chart illustrating a data transmission method applied to a first device according to various embodiments of the present disclosure.

As shown in FIG. 1, embodiments of the present disclosure provide a data transmission method, applied to a first device, including:

block 101, transmitting Uplink (UL) Sounding Reference Signal (SRS) resource configuration information to a second device, where the SRS resource configuration information indicates K SRS resources;

block 102, receiving an SRS signal transmitted from the second device according to the SRS resource configuration information;

block 103, determining an SRS Resource Indicator (SRI), where the SRI indicates L SRS resources in the K SRS resources, L is an integer that is larger than or equal to 1 and L is less than or equals K; and block 104, transmitting the SRI to the second device.

Through the above steps, the first device, as the TRP, first transmits the SRS resource configuration information, which indicates K SRS resources and is configured for the second device, to the second device. The second device receives the SRS resource configuration information, and then transmits the SRS through K SRS resources according to the SRS resource configuration information. After the first device receives the SRS transmitted from the second device, the first device optimally selects L SRS resources from K SRS resources and determines the SRI indicating the L SRS resources. Then, the first device transmits the SRI to the second device to inform the second device of the SRS resources of UL data transmission. Therefore, after receiving the SRI, the second device can use the L optimal SRS resources to complete the UL data transmission, so as to solve the problem that the existing mode cannot determine the specific implementation process of UL data transmission.

In block 103, the first device can select L SRS resources ($1 \leq L \leq K$) and determine SRI based on the measurement of signal quality of the K SRS resources. Specifically, the first device selects L SRS resources, such as L SRS resources (target SRS resources) with the highest receiving quality, according to the preset mode of the system. Preferably, L is greater than or equal to 1. Here, the SRI value determined by the first device can include L SRS resources, that is, each SRI value corresponds to one target SRS resource.

In this embodiment, the SRI can be transmitted through the Downlink Control Information (DCI). In consideration of that the value of the SRI can be a variable and therefore the payload of the DCI is variable or a fixed value determined by the maximum number of the SRIs. The actual number of SRI values indicated in the DCI can be equal to or less than the maximum number of SRI values. Some SRI values (if not specified) in the DCI field can be retained. Alternatively, the SRI in the DCI is a fixed s-bit information field and each state of the s-bit information field is configured as being associated with a set of SRS resources by a high-level signaling. Assuming S=2, the association relationship between each state of the s-bit information field and the SRS resources is shown in table 1 below:

TABLE 1

| SRI | Information |
|-----|-------------|
| 0 | {SRS resource 0} |
| 1 | {SRS resource 0, SRS resource 1} |
| 2 | {SRS resource 2, SRS resource 3} |
| 3 | reserved |

According to table 1, when the SRI is parsed as "1" by the second device through receiving DCI, it can be known that the target SRS resources optimally selected by the first device for the second device is "SRS resource 0, SRS resource 1".

It should be known that the second device performs the UL data transmission and needs to know the layer number of the UL data transmission besides knowing the target SRS resource determined by the first device for it via receiving the SRI. When the system does not predefine the layer number of the UL data transmission, the second device cannot determine the layer number of its UL data transmission and cannot complete the UL data transmission. Therefore, on the basis of the above embodiment, the data transmission method in embodiments of the present disclosure further includes:

determining a Transmission Rank Indicator (TRI) corresponding to UL data transmission of the second device, where the TRI denotes layer number of the UL data transmission; and transmitting the TRI to the second device.

The first device determines the TRI corresponding to the UL data transmission of the second device and transmits the TRI to the second device, so that the second device may obtain the layer number of the UL data transmission configured by the first device for the second device in a situation that the system does not predefine the number of the layers of the UL data transmission, thereby completing the final UL data transmission. The TRI may be transmitted to the second device together with the SM or both of them are separately transmitted.

Further, in order to clearly instruct the second device to complete the UL data transmission, in this embodiment, each layer of the UL data transmission has a corresponding relationship with at least one SRS resource indicated by the SM.

Therefore, the second device can use the SRS resources indicated by the SM to transmit the corresponding layer of the UL data transmission according to the corresponding relationship.

Specifically, a UL beam forming matrix adopted by each layer of the UL data transmission is consistent with a UL beam forming matrix of SRS resources corresponding to the layer of the UL data transmission.

Therefore, the second device may optimally select the UL beam forming matrix corresponding to the target SRS resources and definitely obtain the UL beam forming matrix of each layer of the UL data transmission according to the corresponding relationship between the at least one SRS resource in the target SRS resources and the layers of the UL data transmission. In the UL data transmission, the corresponding layers of the UL data transmission are transmitted via the UL beam forming matrix of the L SRS resources.

In addition, an antenna panel adopted by each layer of the UL data transmission is consistent with the antenna panel of the SRS resources corresponding to the layer of the UL data transmission. The second device can definitely obtain the antenna panel of each layer of the UL data transmission via the antenna panel corresponding to the optimally selected target SRS resources and the corresponding relationship between the target SRS resources and the layer of the UL data transmission. In the UL data transmission, the layer of the UL data transmission is transmitted via the antenna panel of the L SRS resources.

Optionally, in this embodiment, the corresponding relationship between the each layer of the UL data transmission and the at least one SRS resource in the L SRS resources is indicated by a Layer-to-SRI mapping Indicator (LSI), and the method further includes:

transmitting the LSI to the second device.

The corresponding relationship between each layer of the UL data transmission and L SRS resources is indicated via the dedicated LSI. The LSI is transmitted to the second device to inform the second device, so that the second device implements the UL data transmission.

It should be known that the corresponding relationship between each layer of the UL data transmission and the target SRS resource indicated by the LSI may be the indication of each layer of the UL data transmission or indication of each codeword. Each codeword is generated by a channel coding module and is subsequently divided into at least one layer of the UL data transmission according to a preset rule.

In scenario one, the LSI is the indication of the each layer of the UL data transmission. For instance, the LSI is a sequence of R variables. R denotes the layer number of the UL data transmission. Each value in the R variable points to one of the L SRI values. As an example, suppose TRP schedules rank=2 (R=2) data transmission. Therefore, the LSI is R=2, which is a sequence of two variables, such as [1, 2]. The first variable represents transmitting layer-1 using the antenna panel and/or UL beam forming matrix of the SRS resource indicated by the first SRI, and transmitting layer-2 using the antenna panel and/or UL beam forming matrix of the SRS resource indicated by the second SRI. This implicitly informs the second device to transmit the layer of the first UL data transmission using the antenna panel, which is the same as that used for transmitting the SRS indicated by the first SRI, and to transmit the layer of the second UL data transmission using the antenna panel, which is the same as that used for transmitting the SRS indicated by the second SRI.

In scenario two, the LSI is the indication of each codeword. For instance, the LSI is a sequence of C variables. C denotes the codeword number of the UL data transmission. Each value in the C variable points to one of the L SRI values. As an example, suppose TRP schedules rank=6 (R=6) data transmission, 6 layers of the UL data transmission respectively belong to two codewords, that is, C=2, 2 codewords are mapped into 6 layers and each codeword is mapped into 3 layers. Therefore, the LSI is C=2, which is a sequence of two variables, such as [1, 2]. The first variable represents transmitting all layers of the first codeword using the antenna panel and/or UL beam forming matrix of the SRS resource indicated by the first SRI, and transmitting all layers of the second codeword using the antenna panel and/or UL beam forming matrix of the SRS resource indicated by the second SRI. This implicitly informs the second device to transmit all layers of the UL data transmission mapped from the first codeword using the antenna panel, which is the same as that used for transmitting the SRS indicated by the first SRI, and to transmit all layers of the UL data transmission mapped from the second codeword using the antenna panel, which is the same as that used for transmitting the SRS indicated by the second SRI.

Optionally, in this embodiment, the corresponding relationship between the each layer of the UL data transmission and the at least one SRS resource in the L SRS resources is indicated by the SRI.

New indicator is not required and the SRI is used to indicate the corresponding relationship between the each layer of the UL data transmission and at least one SRS resource in the L SRS resources to reduce the information transmission and improve resource utilization.

When the SRI indicates the corresponding relationship between the each layer of the UL data transmission and at least one SRS resource in the L SRS resources, specifically, the number L of the SRS resources indicated by SRI is consistent with the layer number of the UL data transmission or codeword number.

Similar to the specific implementation of the above LSI indication, in scenario three, when the number L of the SRS resources indicated by the SRI is consistent with the layer number of the UL data transmission, suppose TRP schedules rank=2 data transmission, the number L of the SRS resources indicated by the SRI equals 2. The layer-1 is transmitted using the antenna panel and/or UL beam forming matrix of the SRS resource indicated by the first SRI, and the layer-2 is transmitted using the antenna panel and/or UL beam forming matrix of the SRS resource indicated by the second SRI. This implicitly informs the second device to transmit the first layer of the UL data transmission using the antenna panel, which is the same as that used for transmitting the SRS indicated by the first SRI, and to transmit the second layer of the UL data transmission using the antenna panel, which is the same as that used for transmitting the SRS indicated by the second SRI.

In scenario four, when the number L of the SRS resources indicated by the SRI is same as the codeword number, suppose TRP schedules rank=6 data transmission, 6 layers of the UL data transmission respectively belong to two codewords, that is, codeword number D=2, 2 codewords are mapped into 6 layers and each codeword is mapped into 3 layers. Therefore, number L of the SRS resources indicated by the SRI equals 2, such as [1, 2]. The first variable represents transmitting all layers of the first codeword using the antenna panel and/or UL beam forming matrix of the SRS resource indicated by the first SRI, and transmitting all layers of the second codeword using the antenna panel and/or UL beam forming matrix of the SRS resources indicated by the second SRI. This implicitly informs the second device to transmit all layers of the UL data transmission mapped from the first codeword using the antenna panel, which is the same as that used for transmitting the SRS indicated by the first SRI, and to transmit all layers of the UL data transmission mapped from the second codeword using the antenna panel, which is the same as that used for transmitting the SRS indicated by the second SRI.

Further, in order to achieve that the corresponding relationship between the SRS resource indicated by the SRI and the layer of the UL data transmission is more definitely indicated and determined by the SRI, further, the k-th SRS resource indicated by the SRI has a corresponding relationship with the k-th layer or k-th codeword of the UL data transmission, $1 \leq k \leq L$ k is an integer.

Here, taking k=1 for example, there is a corresponding relationship between the first SRS resource indicated by the SRI and the first layer or first codeword of the UL data transmission. That is, when the second device performs the UL data transmission, the first SRS resource (first SRS resource) is used to transmit the first UL data transmission layer (the first layer of the UL data transmission), or the first SRS resource (first SRS resource) is used to transmit all layers of the UL data transmission of the first codeword (first codeword).

Further, in this embodiment, the first device may be a cell base station, micro station or wireless network Wireless Fidelity (WIFI) router and other network-side devices. The second device can be a mobile phone, tablet or computer and other user devices, which are not listed here.

To sum up, the data transmission method in embodiments of the present disclosure first transmits the SRS resource configuration information indicating K SRS resources configured for the second device to the second device; and the second device receives the SRS resource configuration information, then transmits the SRS through K SRS resources according to the SRS resource configuration information. After the first device receives the SRS signal transmitted from the second device, L SRS resources are preferably selected from the K SRS resources according to the SRS signal, and the SRI indicating the L SRS resources can be determined. The first device then transmits the SRI to the second device to inform the second device of the SRS resource for its UL data transmission. In this way, after receiving the SRI, the second device can use the preferably-selected L SRS resources to complete the UL data transmission, so as to solve the problem that the existing mode cannot determine the specific implementation process of UL data transmission.

Figure 2:
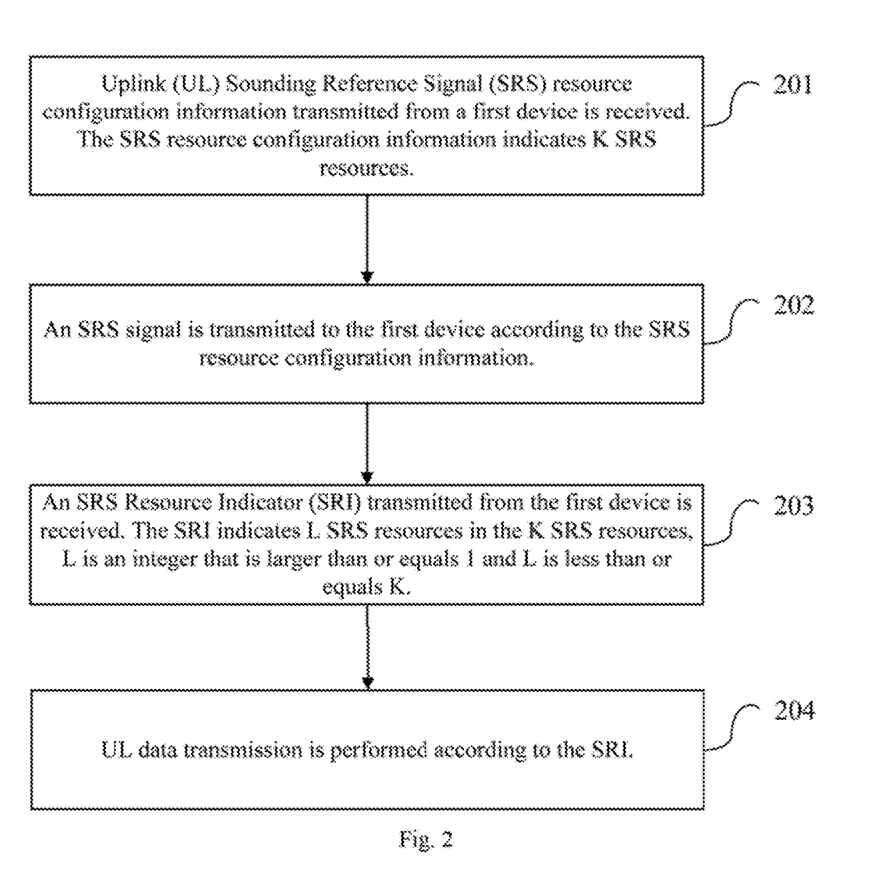
FIG. 2 is a flow chart illustrating a data transmission method applied to a second device according to various embodiments of the present disclosure.

As shown in FIG. 2, embodiments of the present disclosure provide a data transmission method, applied to a second device, including:

Block 201: receiving Uplink (UL) Sounding Reference Signal (SRS) resource configuration information transmitted from a first device, where the SRS resource configuration information indicates K SRS resources;

Block 202: transmitting an SRS signal to the first device according to the SRS resource configuration information;

Block 203: receiving an SRS Resource Indicator (SRI) transmitted from the first device, where the SRI indicates L SRS resources in the K SRS resources, L is an integer that is larger than or equal to 1 and L is less than or equals K; and Block 204: performing UL data transmission according to the SRI.

Through the blocks 201 to 204, the second device first receives the SRS resource configuration information, which is configured by the first device for the second device and is used to indicate the K SRS resources, then transmits the SRS to the first device using K SRS resources according to the SRS resource configuration information, so that after the first device receives the SRS signal, the first device preferably selects L SRS resources from the K SRS resources, determines the SRI indicating the L SRS resources and transmits the SRI to the second device. After receiving the SRI, the second device can use the preferably-selected L SRS resources to complete the UL data transmission, so as to solve the problem that the existing mode cannot determine the specific implementation process of UL data transmission.

In a situation that the system does not predefine the layer number of the UL data transmission, corresponding to the TRI determined by and transmitted from the first device, the method in this embodiment further includes:

receiving a Transmission Rank Indicator (TRI) corresponding to the UL data transmission transmitted from the first device, where the TRI denotes layer number of the UL data transmission; and parsing the TRI to obtain the layer number of the UL data transmission determined by the first device for the second device.

By receiving the TRI corresponding to the UL data transmission of the second device, which is determined by and transmitted from the first device, in the situation that the system does not predefine the layer number of the UL data transmission, the second device may obtain the layer number of the UL data transmission determined for it by the first device via parsing the TRI to implement the final UL data transmission.

Further, in order to clearly instruct the second device to complete the UL data transmission, in this embodiment, each layer of the UL data transmission has a corresponding relationship with at least one SRS resource indicated by the SM.

Specifically, a UL beam forming matrix adopted by each layer of the UL data transmission is consistent with a UL beam forming matrix of SRS resources corresponding to the layer of the UL data transmission.

Optionally, the corresponding relationship between the each layer of the UL data transmission and the at least one SRS resource in the L SRS resources is indicated by the LSI, and the method further includes:

receiving the LSI transmitted from the first device;

parsing the LSI to obtain the corresponding relationship between the each layer of the UL data transmission and the at least one SRS resource in the L SRS resources.

When the first device indicates the corresponding relationship between each layer of the UL data transmission and at least one SRS resource in L SRS resources via the dedicated LSI, the second device obtains the corresponding relationship between the at least one SRS resource in the L SRS resources and each layer of the UL data transmission via parsing the LSI to implement the UL data transmission. Similar to the above embodiment, the corresponding relationship between each layer of the UL data transmission and at least one SRS resource in the target SRS resources indicated by the LSI may be the indication of each layer of the UL data transmission or indication of each codeword, which is not repeated here.

Optionally, in this embodiment, the corresponding relationship between the each layer of the UL data transmission and the at least one SRS resource in the L SRS resources is indicated by the SRI.

The block 204 includes:

parsing the SRI to obtain the corresponding relationship between the each layer of the UL data transmission and the at least one SRS resource in the L SRS resources;

respectively transmitting corresponding layers of the UL data transmission using the L SRS resources.

Here, no new indicator is added. The first device uses the SRI to indicate the corresponding relationship between at least one SRS resources in L SRS resources and each layer of the UL data transmission. The second device obtains the corresponding relationship between at least one SRS resources in L SRS resources and each layer of the UL data transmission via parsing the SRI and respectively transmits the layer of the UL data transmission using the L SRS resources.

When the SRI indicates the corresponding relationship between the at least one SRS resource in the L SRS resources and each layer of the UL data transmission, number L of the SRS resources indicated by the SRI is consistent with layer number of the UL data transmission or codeword number.

Further, the k-th SRS resource indicated by the SRI has a corresponding relationship with the k-th layer of the UL data transmission or the k-th codeword, 1≤k≤L, k is an integer.

In the method of this embodiment, the second device first receives the SRS resource configuration information, which is configured by the first device for the second device and is used to indicate K SRS resources, then transmits the SRS to the first device using K SRS resources according to the SRS resource configuration information, so that after the first device receives the SRS signal, the first device preferably selects L SRS resources from the K SRS resources, determines the SRI indicating the L SRS resources and transmits the SRI to the second device. After receiving the SRI, the second device can use the preferably-selected L SRS resources to complete the UL data transmission, so as to solve the problem that the existing mode cannot determine the specific implementation process of UL data transmission.

It should be noted that because the data transmission method applied to the second device in this embodiment is used to cooperate with the data transmission method applied to the first device in the above embodiment. The implementation mode of the data transmission method applied to the first device in the above embodiment is also suitable for this method, also can achieve the same technical effect, which is not repeated here.

Figure 3:
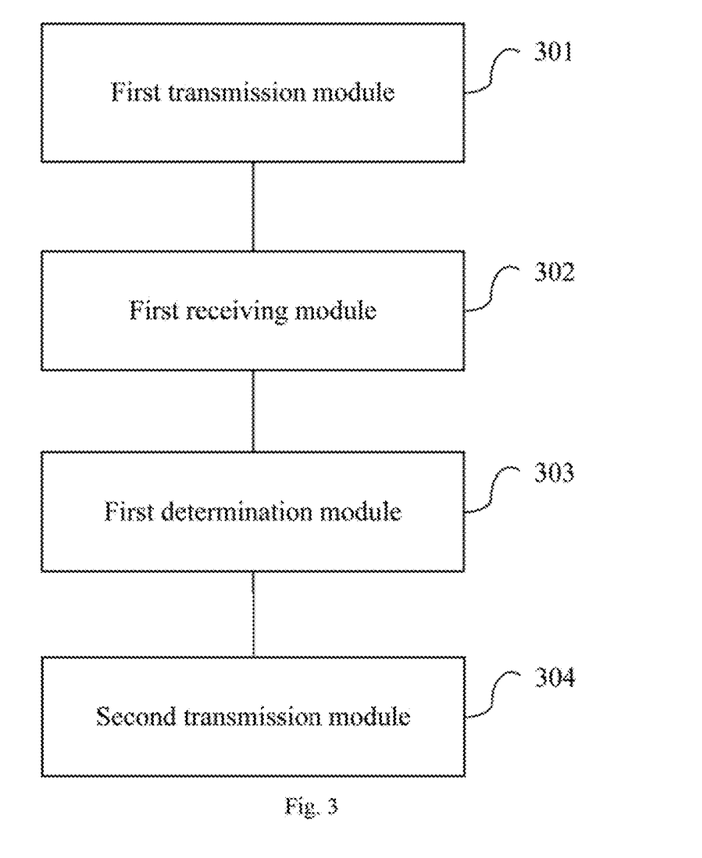
FIG. 3 is a schematic diagram illustrating a device of the method in the FIG. 1.

As shown in FIG. 3, embodiments of the present disclosure further provide a data transmission device, applied to a first device, including:

a first transmission module 301, configured to transmit Uplink (UL) Sounding Reference Signal (SRS) resource configuration information to a second device, where the SRS resource configuration information indicates K SRS resources;

a first receiving module 302, configured to receive an SRS signal transmitted from the second device according to the SRS resource configuration information;

a first determination module 303, configured to determine an SRS Resource Indicator (SRI), where the SRI indicates L SRS resources in the K SRS resources, L is an integer that is larger than or equals 1 and L is less than or equals K; and a second transmission module 304, configured to transmit the SRI to the second device.

The device further includes:

a second determination module, configured to determine a Transmission Rank Indicator (TRI) corresponding to UL data transmission of the second device, where the TRI denotes layer number of the UL data transmission; and a third transmission module, configured to transmit the TRI to the second device.

The each layer of the UL data transmission has a corresponding relationship with at least one SRS resource indicated by the SRI.

A UL beam forming matrix adopted by the each layer of the UL data transmission is consistent with a UL beam forming matrix of SRS resources corresponding to the layer of the UL data transmission.

The corresponding relationship between the each layer of the UL data transmission and the at least one SRS resource in the L SRS resources is indicated by the LSI, and the device further includes:

a fourth transmission module, configured to transmit the LSI to the second device.

The corresponding relationship between the each layer of the UL data transmission and the at least one SRS resource in the L SRS resources is indicated by the SRI.

Number L of SRS resources indicated by the SM is consistent with layer number of the UL data transmission or codeword number.

The k-th SRS resource indicated by the SM has a corresponding relationship with the k-th layer of the UL data transmission or k-th codeword, 1≤k≤L, k is an integer.

The data transmission device in this embodiment of the present disclosure first transmits the SRS resource configuration information indicating K SRS resources configured for the second device to the second device; and the second device receives the SRS resource configuration information, then transmits the SRS through K SRS resources according to the SRS resource configuration information. After the first device receives the SRS signal transmitted from the second device, L SRS resources are preferably selected, and SM indicating the L SRS resources can be determined. The first device then transmits the SM to the second device to inform the second device of the SRS resource for its UL data transmission. In this way, after receiving the SM, the second device can use the preferably-selected L SRS resources to complete the UL data transmission, so as to solve the problem that the existing mode cannot determine the specific implementation process of UL data transmission.

It should be noted that because the device is that adopting the data transmission method applied to the first device. The implementation mode of the data transmission method applied to the first device in the above embodiment is also suitable for this device, also can achieve the same technical effect.

Figure 4:
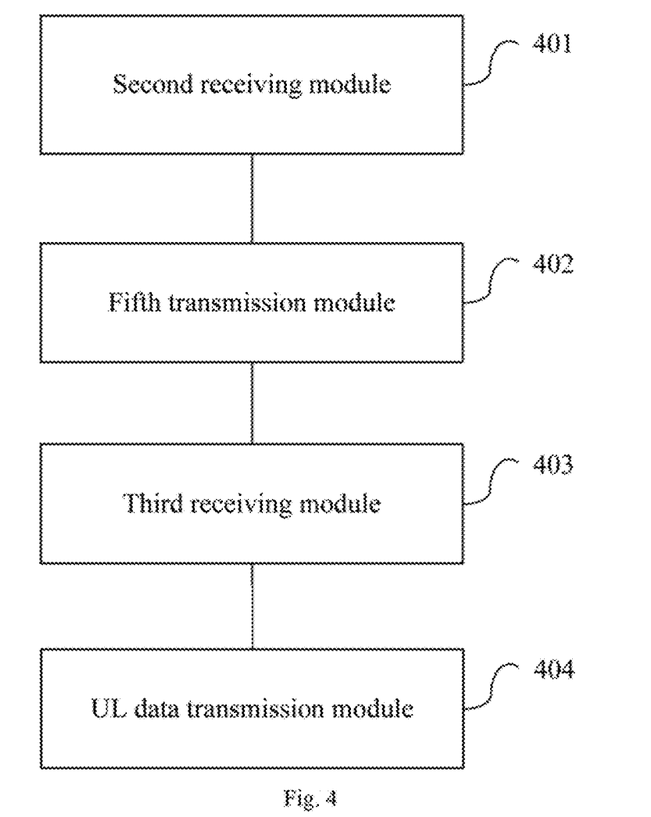
FIG. 4 is a schematic diagram illustrating a device of the method in the FIG. 2.

As shown in FIG. 4, embodiments of the present disclosure further provide a data transmission device, applied to a second device, including:

a second receiving module 401, configured to receive Uplink (UL) Sounding Reference Signal (SRS) resource configuration information transmitted from a first device, where the SRS resource configuration information indicates K SRS resources;

a fifth transmission module 402, configured to transmit an SRS signal to the first device according to the SRS resource configuration information;

a third receiving module 403, configured to receive an SRS Resource Indicator (SRI) transmitted from the first device, where the SRI indicates L SRS resources in the K SRS resources, L is an integer that is larger than or equals 1 and L is less than or equals K; and a UL data transmission module 404, configured to perform UL data transmission according to the SRI.

The device further includes:

a fourth receiving module, configured to receive a Transmission Rank Indicator (TRI) corresponding to the UL data transmission transmitted from the first device, where the TRI denotes layer number of the UL data transmission; and a first processing module, configured to parse the TRI to obtain layer number of the UL data transmission determined by the first device for the second device.

The each layer of the UL data transmission has a corresponding relationship with at least one SRS resource indicated by the SRI.

A UL beam forming matrix adopted by the each layer of the UL data transmission is consistent with a UL beam forming matrix of SRS resources corresponding to the layer of the UL data transmission.

The corresponding relationship between the each layer of the UL data transmission and the at least one SRS resource in the L SRS resources is indicated by the LSI, and the device further includes:

a fifth receiving module, configured to receive the LSI transmitted from the first device; and a second processing module, configured to parse the LSI to obtain the corresponding relationship between the each layer of the UL data transmission and the at least one SRS resource in the L SRS resources.

The corresponding relationship between the each layer of the UL data transmission and the at least one SRS resource in the L SRS resources is indicated by the SRI, the UL data transmission module includes:

a parsing sub-module, configured to parse the SRI to obtain the corresponding relationship between the each layer of the UL data transmission and the at least one SRS resource in the L SRS resources;

a transmission sub-module, configured to respectively transmit corresponding layers of UL data transmission using the L SRS resources.

Number L of SRS resources indicated by the SRI is consistent with layer number of the UL data transmission or codeword number.

The k-th SRS resource indicated by the SRI has a corresponding relationship with the k-th layer of the UL data transmission or k-th codeword, $1 \leq k \leq L$, k is an integer.

The device in this embodiment first receives SRS resource configuration information, which is configured by the first device for the second device and is used to indicate K SRS resources, then transmits the SRS to the first device using K SRS resources according to the SRS resource configuration information, so that after the first device receives the SRS signal, the first device preferably selects L SRS resources, determines the SRI indicating the L SRS resources and transmits the SRI to the second device. After receiving the SRI, the second device can use the preferably-selected L SRS resources to complete the UL data transmission, so as to solve the problem that the existing mode cannot determine the specific implementation process of the UL data transmission.

It should be noted that the device is that adopting the data transmission method applied to the second device. The implementation mode of the data transmission method is also suitable for this device, also can achieve the same technical effect.

Another embodiment of the present disclosure provides a computer readable storage medium, in which computer programs are stored. When the computer programs are executed by the processor, following steps are performed: transmitting Uplink (UL) Sounding Reference Signal (SRS) resource configuration information to a second device, where the SRS resource configuration information indicates K SRS resources; receiving an SRS signal transmitted from the second device according to the SRS resource configuration information; determining an SRS Resource Indicator (SRI), where the SRI indicates L SRS resources in the K SRS resources, L is an integer that is larger than or equals 1 and L is less than or equals K; and transmitting the SRI to the second device.

Optionally, when the computer programs are executed by the processor, following steps are implemented: determining a Transmission Rank Indicator (TRI) corresponding to UL data transmission of the second device, where the TRI denotes layer number of the UL data transmission; and transmitting the TRI to the second device.

Optionally, each layer of the UL data transmission has a corresponding relationship with at least one SRS resource indicated by the SRI.

Optionally, a UL beam forming matrix adopted by each layer of the UL data transmission is consistent with a UL beam forming matrix of SRS resources corresponding to the layer of the UL data transmission.

Optionally, the corresponding relationship between the each layer of the UL data transmission and the at least one SRS resource in the L SRS resources is indicated by the LSI. When the computer programs are executed by the processor, following steps may be implemented: transmitting the LSI to the second device.

Optionally, the corresponding relationship between the each layer of the UL data transmission and the at least one SRS resource in the L SRS resources is indicated by the SRI.

Optionally, number L of SRS resources indicated by the SRI is consistent with layer number of the UL data transmission or codeword number.

Optionally, the k-th SRS resource indicated by the SRI has a corresponding relationship with the k-th layer of the UL data transmission or k-th codeword, $1 \leq k \leq L$, k is an integer.

The computer readable medium includes permanent and non-permanent, mobile and non-mobile media and can be implemented by any method or technology to store information. The information can be computer-readable instructions, data structures, program modules, or other data. Examples of the computer storage medium include, but are not limited to, Phase-Change Random Access Memory (PRAM), Static Random Access Memory (SRAM), Dynamic Random Access Memory (DRAM), and other types of RAMs, Read-Only Memory (ROM), Electrically Erasable Programmable Read Only Memory (EEPROM), flash memory, or other memory technologies, Compact Disc Read-Only Memory (CD-ROM), Digital Versatile Disc (DVD) or other optical storages, magnetic tape cassettes, magnetic tape storages or other magnetic storage devices or any other non-transmission mediums that can be used to store information that can be accessed by computing devices. As defined in embodiments of the present disclosure, the computer readable medium does not include transitory media, such as modulated data signals and carriers.

Another embodiment of the present disclosure provides a computer readable storage medium in which computer programs are stored. When the computer programs are executed by the processor, following steps are performed: receiving Uplink (UL) Sounding Reference Signal (SRS) resource configuration information transmitted from a first device, where the SRS resource configuration information indicates K SRS resources; transmitting an SRS signal to the first device according to the SRS resource configuration information; receiving an SRS Resource Indicator (SRI) transmitted from the first device, where the SRI indicates L SRS resources in the K SRS resources, L is an integer that is larger than or equals 1 and L is less than or equals K; and performing UL data transmission according to the SRI.

Optionally, when the programs are executed by the processor, following steps are implemented: receiving a Transmission Rank Indicator (TRI) corresponding to the UL data transmission transmitted from the first device, where the TRI denotes layer number of the UL data transmission; and parsing the TRI to obtain layer number of the UL data transmission determined by the first device for the second device.

Optionally, each layer of the UL data transmission has a corresponding relationship with at least one SRS resource indicated by the SRI.

Optionally, a UL beam forming matrix adopted by each layer of the UL data transmission is consistent with a UL beam forming matrix of SRS resources corresponding to the layer of the UL data transmission.

Optionally, the corresponding relationship between the each layer of the UL data transmission and the at least one SRS resource in the L SRS resources is indicated by the LSI. When the computer programs are executed by the processor, following steps may be implemented: receiving the LSI transmitted from the first device; parsing the LSI to obtain the corresponding relationship between the each layer of the UL data transmission and the at least one SRS resource in the L SRS resources.

Optionally, the corresponding relationship between the each layer of the UL data transmission and the at least one SRS resource in the L SRS resources is indicated by the SM. When the computer programs are executed by the processor, following steps may be executed: parsing the SRI to obtain the corresponding relationship between the each layer of the UL data transmission and the at least one SRS resource in the L SRS resources; respectively transmitting corresponding layers of UL data transmission using the L SRS resources.

Optionally, number L of SRS resources indicated by the SM is consistent with layer number of the UL data transmission or codeword number.

Optionally, the k-th SRS resource indicated by the SRI has a corresponding relationship with the k-th layer of the UL data transmission or k-th codeword, $1 \leq k \leq L$, k is an integer.

The computer readable medium includes permanent and non-permanent, mobile and non-mobile media and can be implemented by any method or technology to store information. The information can be computer-readable instructions, data structures, program modules, or other data. Examples of the computer storage medium include, but are not limited to, Phase-Change Random Access Memory (PRAM), Static Random Access Memory (SRAM), Dynamic Random Access Memory (DRAM), and other types of RAMs, Read-Only Memory (ROM), Electrically Erasable Programmable Read Only Memory (EEPROM), flash memory, or other memory technologies, Compact Disc Read-Only Memory (CD-ROM), Digital Versatile Disc (DVD) or other optical storages, magnetic tape cassettes, magnetic tape storages or other magnetic storage devices or any other non-transmission mediums that can be used to store information that can be accessed by computing devices. As defined in embodiments of the present disclosure, the computer readable medium does not include transitory media, such as modulated data signals and carriers.

Figure 5:
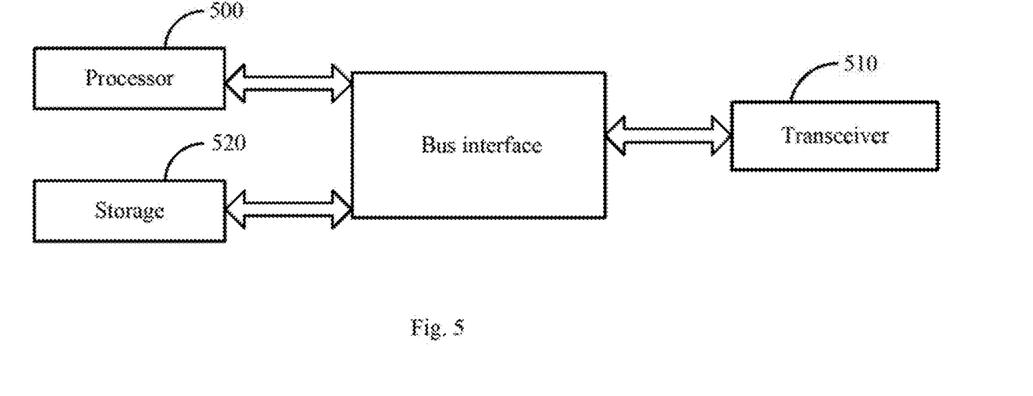
FIG. 5 is a schematic diagram illustrating structure of a network side device according to various embodiments of the present disclosure.

As shown in FIG. 5, embodiments of the present disclosure further provide a network side device, including: a storage 520, a transceiver 510, a processor 500 and computer programs, which are stored in the storage 520 and run on the processor 500. When the processor 500 executes the programs, following steps are implemented: transmitting Uplink (UL) Sounding Reference Signal (SRS) resource configuration information to a second device via the transceiver 510, where the SRS resource configuration information indicates K SRS resources; receiving an SRS signal transmitted from the second device according to the SRS resource configuration information; determining an SRS Resource Indicator (SRI), where the SRI indicates L SRS resources in the K SRS resources, L is an integer that is larger than or equals 1 and L is less than or equals K; and transmitting the SRI to the second device.

The transceiver 510 is configured to receive and transmit data under the control of the processor 500.

Optionally, the processor 500 also may implement following steps: determining a Transmission Rank Indicator (TRI) corresponding to UL data transmission of the second device, where the TRI denotes layer number of the UL data transmission; and transmitting the TRI to the second device.

Optionally, each layer of the UL data transmission has a corresponding relationship with at least one SRS resource indicated by the SRI.

Optionally, a UL beam forming matrix adopted by each layer of the UL data transmission is consistent with a UL beam forming matrix of SRS resources corresponding to the layer of the UL data transmission.

Optionally, the corresponding relationship between the each layer of the UL data transmission and the at least one SRS resource in the L SRS resources is indicated by the LSI. The processor 500 further may implement following steps: transmitting the LSI to the second device.

Optionally, the corresponding relationship between the each layer of the UL data transmission and the at least one SRS resource in the L SRS resources is indicated by the SM.

Optionally, number L of SRS resources indicated by the SRI is consistent with layer number of the UL data transmission or codeword number.

Optionally, the k-th SRS resource indicated by the SRI has a corresponding relationship with the k-th layer of the UL data transmission or k-th codeword, $1 \leq k \leq L$, k is an integer.

In FIG. 5, the bus architecture can include any number of interconnected buses and bridges, which are specifically linked by various circuits, such as one or more processors represented by processor 500 and one or more storages represented by storage 520. The bus architecture can also link various other circuits such as peripheral devices, voltage regulators, and power management circuits, all of which are well known in this field and are therefore not further described in the present disclosure. The bus interface provides an interface. The transceiver 510 may include a plurality of components, i.e., a transmitter and a transceiver and provide a unit for communicating with various other devices on the transmission medium. The processor 500 is responsible for managing the bus architecture and general processing, and the storage 520 may store data used by the processor 500 in performing operations.

Figure 6:
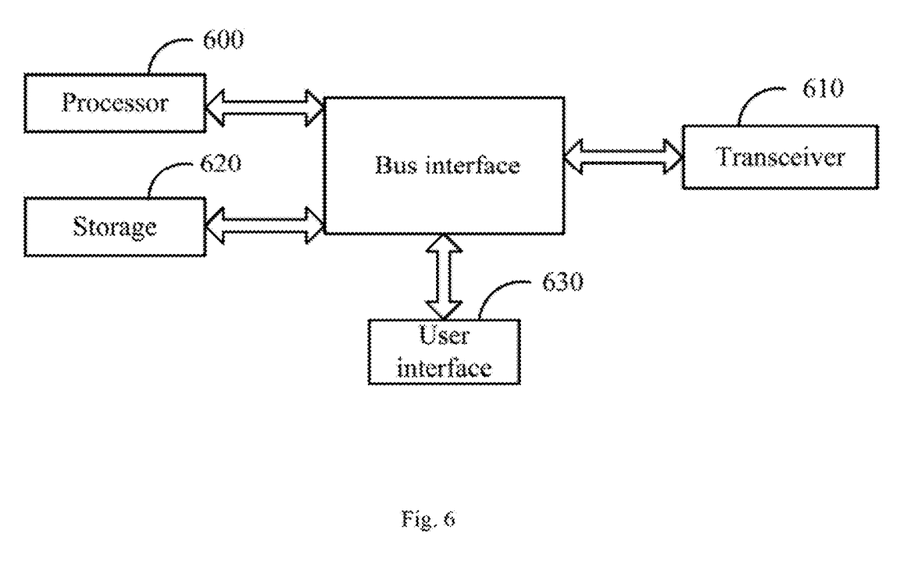
FIG. 6 is a schematic diagram illustrating structure of a UE according to various embodiments of the present disclosure.

As shown in FIG. 6, embodiments of the present disclosure further provide a UE, including: a storage 620, a transceiver 610, a processor 600 and computer programs, which are stored in the storage 620 and run on the processor 600. When the processor 600 executes the programs, following steps are implemented: receiving Uplink (UL) Sounding Reference Signal (SRS) resource configuration information transmitted from a first device via the transceiver 610, where the SRS resource configuration information indicates K SRS resources; transmitting an SRS signal to the first device according to the SRS resource configuration information; receiving an SRS Resource Indicator (SRI) transmitted from the first device, where the SRI indicates L SRS resources in the K SRS resources, L is an integer that is larger than or equals 1 and L is less than or equals K; and performing UL data transmission according to the SRI.

The transceiver 610 is configured to receive and transmit data under the control of the processor 600.

Optionally, the processor 600 may further implement following steps: receiving a Transmission Rank Indicator (TRI) corresponding to the UL data transmission transmitted from the first device, where the TRI denotes layer number of the UL data transmission; and parsing the TRI to obtain the layer number of the UL data transmission determined by the first device for the second device.

Optionally, each layer of the UL data transmission has a corresponding relationship with at least one SRS resource indicated by the SRI.

Optionally, a UL beam forming matrix adopted by each layer of the UL data transmission is consistent with a UL beam forming matrix of SRS resources corresponding to the layer of the UL data transmission.

Optionally, the corresponding relationship between the each layer of the UL data transmission and the at least one SRS resource in the L SRS resources is indicated by the LSI. The processor 600 is further configured to implement following steps: receiving the LSI transmitted from the first device and parsing the LSI to obtain the corresponding relationship between each layer of the UL data transmission and L SRS resources.

Optionally, the corresponding relationship between the each layer of the UL data transmission and the at least one SRS resource in the L SRS resources is indicated by the SRI. The processor 600 may further implement following blocks: parsing the SRI to obtain the corresponding relationship between the each layer of the UL data transmission and the at least one SRS resource in the L SRS resources; respectively transmitting corresponding layers of UL data transmission using the L SRS resources.

Optionally, number L of SRS resources indicated by the SRI is consistent with layer number of the UL data transmission or codeword number.

Optionally, the k-th SRS resource indicated by the SRI has a corresponding relationship with the k-th layer of the UL data transmission or k-th codeword, $1 \leq k \leq L$, k is an integer.

In FIG. 6, the bus architecture can include any number of interconnected buses and bridges, which are specifically linked by various circuits, such as one or more processors represented by processor 600 and one or more storages represented by storage 620. The bus architecture can also link various other circuits such as peripheral devices, voltage regulators, and power management circuits, all of which are well known in this field and are therefore not further described in the present disclosure. The bus interface provides an interface. The transceiver 610 may include a plurality of components, i.e., a transmitter and a transceiver, and provide a unit for communicating with various other devices on the transmission medium. As for different UEs, the user interface 630 may further externally connect or internally connect interfaces of required devices. The connected devices may include but not be limited to a keypad, monitor, speaker, microphone, joystick, etc.

The processor 600 is responsible for managing the bus architecture and usual processing and the storage 620 may store the data used by the processor 600 when executing the operations.

Further, it should be noted that many of the functional components described in this specification are referred to modules to specifically emphasize the independence of their implementation.

In embodiments of the present disclosure, the module may be implemented using software for execution by various types of processors. For example, an identified executable code module can contain one or more physical or logical blocks of computer instructions, which can be built as objects, procedures, or functions, for example. However, executable codes of the identified module do not need to be physically placed together, but can include different instructions stored in different locations. When logically combined, these codes construct modules and may implement specified purpose of the module.

In fact, executable code modules can be a single instruction or many instructions, and can even be distributed over many different code snippets, among different programs, and across multiple memory devices. Similarly, operational data can be identified within a module, implemented in any appropriate form, and organized within any appropriate type of data structure. The operational data may be collected as a single data set or may be distributed in different locations (including in different storage devices) and may exist, at least in part, only as an electronic signal on a system or network.

When the modules can be implemented using the software, in consideration of the technological level of the existing hardware, the modules may be implemented using the software. In the case of not considering the cost, those skilled in the art of the present disclosure can set up the corresponding hardware circuit to realize the corresponding function. The hardware circuit includes conventional Very Large Scale Integration (VLSI) circuits or gate array, existing semiconductor, such as the logic chip, transistor, or other discrete components. Modules can also be implemented with a programmable hardware device, such as a field programmable gate array, a programmable array logic, a programmable logic device, etc.

The above exemplary embodiments are described in reference to the attached drawings, and many different forms and embodiments are feasible without deviating from the spirit and teachings of the present disclosure. Therefore, the present disclosure should not be constructed as a limitation to the exemplary embodiments proposed herein. Rather, these exemplary embodiments are provided to make the present disclosure more perfection and complete, and to communicate the scope of the present disclosure to those who are familiar with the technology. In these figures, component size and relative size may be enlarged for clarity. The terms used here are intended only to describe specific exemplary embodiments and are not intended to be restrictive. As used herein, the singular forms "a/an", "one" and "the" are intended to include those multiple forms unless they are clearly defined as other meanings in embodiments of the present disclosure. The terms "include" and/or "comprise", when used in this specification, represent the presence of the features, integers, steps, operations, components and/or components, without excluding the presence or addition of one or more other features, integers, steps, operations, components, components and/or their populations. Unless otherwise indicated, a range of values includes the upper and lower limits of the range and any sub-range between them.

The foregoing only describes preferred embodiments of the present disclosure. To those skilled in the art, several modifications and enhancements can be made without departing from the principle of the present disclosure. These modifications and enhancements should be covered by the protection scope of the present disclosure.

What is claimed is:

1. A data transmission method, applied to a first device, comprising:
    transmitting Uplink (UL) Sounding Reference Signal (SRS) resource configuration information to a second device; wherein the SRS resource configuration information indicates K SRS resources;
    receiving an SRS signal transmitted from the second device according to the SRS resource configuration information;
    determining an SRS Resource Indicator (SRI); wherein the SRI indicates L SRS resources in the K SRS resources, L is an integer that is larger than or equals 1 and L is less than or equals K; and transmitting the SRI to the second device;

wherein each layer of the UL data transmission has a corresponding relationship with at least one SRS resource indicated by the SRI;

wherein a UL beam forming matrix adopted by each layer of the UL data transmission is consistent with a UL beam forming matrix of SRS resources corresponding to the layer of the UL data transmission.

2. The data transmission method according to claim 1, further comprising:

determining a Transmission Rank Indicator (TRI) corresponding to UL data transmission of the second device; wherein the TRI denotes layer number of the UL data transmission; and transmitting the TRI to the second device.

3. The data transmission method according to claim 1, wherein the corresponding relationship between the each layer of the UL data transmission and the at least one SRS resource in the L SRS resources is indicated by a Layer-to-SRI mapping Indicator (LSI); and the method further comprises:

transmitting the LSI to the second device.

4. The data transmission method according to claim 1, wherein the corresponding relationship between the each layer of the UL data transmission and the at least one SRS resource in the L SRS resources is indicated by the SRI.

5. The data transmission method according to claim 4, wherein the number L of SRS resources indicated by the SRI is consistent with the layer number of the UL data transmission or codeword number.

6. The data transmission method according to claim 4, wherein a k-th SRS resource indicated by the SRI has a corresponding relationship with a k-th layer of the UL data transmission or k-th codeword, 1≤k≤L, k is an integer.

7. A data transmission method, applied to a second device, comprising:

receiving Uplink (UL) Sounding Reference Signal (SRS) resource configuration information transmitted from a first device; wherein the SRS resource configuration information indicates K SRS resources;

transmitting an SRS signal to the first device according to the SRS resource configuration information;

receiving an SRS Resource Indicator (SRI) transmitted from the first device; wherein the SRI indicates L SRS resources in the K SRS resources, L is an integer that is larger than or equals 1 and L is less than or equals K; and performing UL data transmission according to the SRI;

wherein each layer of the UL data transmission has a corresponding relationship with at least one SRS resource indicated by the SRI;

wherein a UL beam forming matrix adopted by each layer of the UL data transmission is consistent with a UL beam forming matrix of SRS resources corresponding to the layer of the UL data transmission.

8. The data transmission method according to claim 7, further comprising:

receiving a Transmission Rank Indicator (TRI) corresponding to the UL data transmission transmitted from the first device; wherein the TRI denotes a layer number of the UL data transmission; and parsing the TRI to obtain the layer number of the UL data transmission determined by the first device for the second device.

9. The data transmission method according to claim 7, wherein the corresponding relationship between the each layer of the UL data transmission and the at least one SRS resource in the L SRS resources is indicated by a Layer-to-SRI mapping Indicator (LSI); and the method further comprises:

receiving the LSI transmitted from the first device;

parsing the LSI to obtain the corresponding relationship between the each layer of the UL data transmission and the at least one SRS resource in the L SRS resources.

10. The data transmission method according to claim 7, wherein the corresponding relationship between the each layer of the UL data transmission and the at least one SRS resource in the L SRS resources is indicated by the SRI, performing the UL data transmission according to the SRI comprises:

parsing the SRI to obtain the corresponding relationship between the each layer of the UL data transmission and the at least one SRS resource in the L SRS resources; and respectively transmitting corresponding layers of UL data transmission using the L SRS resources.

11. The data transmission method according to claim 10, wherein the number L of SRS resources indicated by the SRI is consistent with the layer number of the UL data transmission or codeword number.

12. The data transmission method according to claim 10, wherein a k-th SRS resource indicated by the SRI has a corresponding relationship with a k-th layer of the UL data transmission or k-th codeword, 1≤k≤L, k is an integer.

13. A network side device, comprising: a storage, a transceiver, a processor and computer programs, which are stored in the storage and run on the processor; wherein when the processor executes the computer programs, following steps are implemented: transmitting Uplink (UL) Sounding Reference Signal (SRS) resource configuration information to a second device via the transceiver, wherein the SRS resource configuration information indicates K SRS resources; receiving an SRS signal transmitted from the second device according to the SRS resource configuration information; determining an SRS Resource Indicator (SRI), wherein the SRI indicates L SRS resources in the K SRS resources, L is an integer that is larger than or equals 1 and L is less than or equals K; and transmitting the SRI to the second device;

wherein each layer of the UL data transmission has a corresponding relationship with at least one SRS resource indicated by the SRI;

wherein a UL beam forming matrix adopted by each layer of the UL data transmission is consistent with a UL beam forming matrix of SRS resources corresponding to the layer of the UL data transmission.

14. A user device, comprising: a storage, a transceiver, a processor and computer programs, which are stored in the storage and run on the processor; wherein when the processor executes the computer programs, following steps of claim 7 are implemented: receiving Uplink (UL) Sounding Reference Signal (SRS) resource configuration information transmitted from a first device via the transceiver, wherein the SRS resource configuration information indicates K SRS resources; transmitting an SRS signal to the first device according to the SRS resource configuration information; receiving an SRS Resource Indicator (SRI) transmitted from the first device, wherein the SRI indicates L SRS resources in the K SRS resources, L is an integer that is larger than or equals 1 and L is less than or equals K; and performing UL data transmission according to the SRI;

wherein each layer of the UL data transmission has a corresponding relationship with at least one SRS resource indicated by the SRI;

wherein a UL beam forming matrix adopted by each layer of the UL data transmission is consistent with a UL beam forming matrix of SRS resources corresponding to the layer of the UL data transmission.

15. The network side device according to claim 13, wherein the processor is configured to, determine a Transmission Rank Indicator (TRI) corresponding to UL data transmission of the second device; wherein the TRI denotes layer number of the UL data transmission; and transmit the TRI to the second device.

16. The user device according to claim 14, wherein the processor is configured to, receive a Transmission Rank Indicator (TRI) corresponding to the UL data transmission transmitted from the first device; wherein the TRI denotes a layer number of the UL data transmission; and parse the TRI to obtain the layer number of the UL data transmission determined by the first device for the second device.

\* \* \* \* \*